United States Patent [19]

Vasudeva et al.

[11] 4,083,509
[45] Apr. 11, 1978

[54] REEL FOR MAGNETIC RECORDING TAPE

[75] Inventors: Anil Vasudeva, San Jose; Don W. Geri, Palo Alto, both of Calif.

[73] Assignee: Memorex Corporation, Santa Clara, Calif.

[21] Appl. No.: 783,980

[22] Filed: Apr. 4, 1977

Related U.S. Application Data

[63] Continuation of Ser. No. 728,503, Oct. 1, 1976, abandoned.

[51] Int. Cl.² ............................................. B65H 75/18
[52] U.S. Cl. .................................................... 242/71.8
[58] Field of Search .................. 242/71.8, 118.4, 118.7, 242/118.8, 116; 197/175

[56] References Cited

U.S. PATENT DOCUMENTS

| | | | |
|---|---|---|---|
| 3,088,689 | 5/1963 | Perlini | 242/71.8 |
| 3,229,928 | 1/1966 | Burgess | 242/71.8 |
| 3,327,960 | 6/1967 | Hedin | 242/71.8 |
| 3,389,872 | 6/1968 | Lyman | 242/71.8 |
| 3,410,500 | 11/1968 | Elliott | 242/71.8 |
| 3,545,696 | 12/1970 | Berkey | 242/71.8 |

Primary Examiner—Edward J. McCarthy
Attorney, Agent, or Firm—Limbach, Limbach & Sutton

[57] ABSTRACT

A reel for magnetic recording tape includes a hub having axially extending coaxial inner and outer rims joined by a radially extending web, and an intermediate ring on each side of the web extending axially outwardly of the web and a pair of opposed flanges. The flanges are attached to and extend radially outwardly of the respective hub intermediate rings and each flange includes hub support means cooperating with its respectively adjacent hub intermediate ring and the hub outer rim to assist the hub outer rim in resisting radially inward deflection.

26 Claims, 6 Drawing Figures

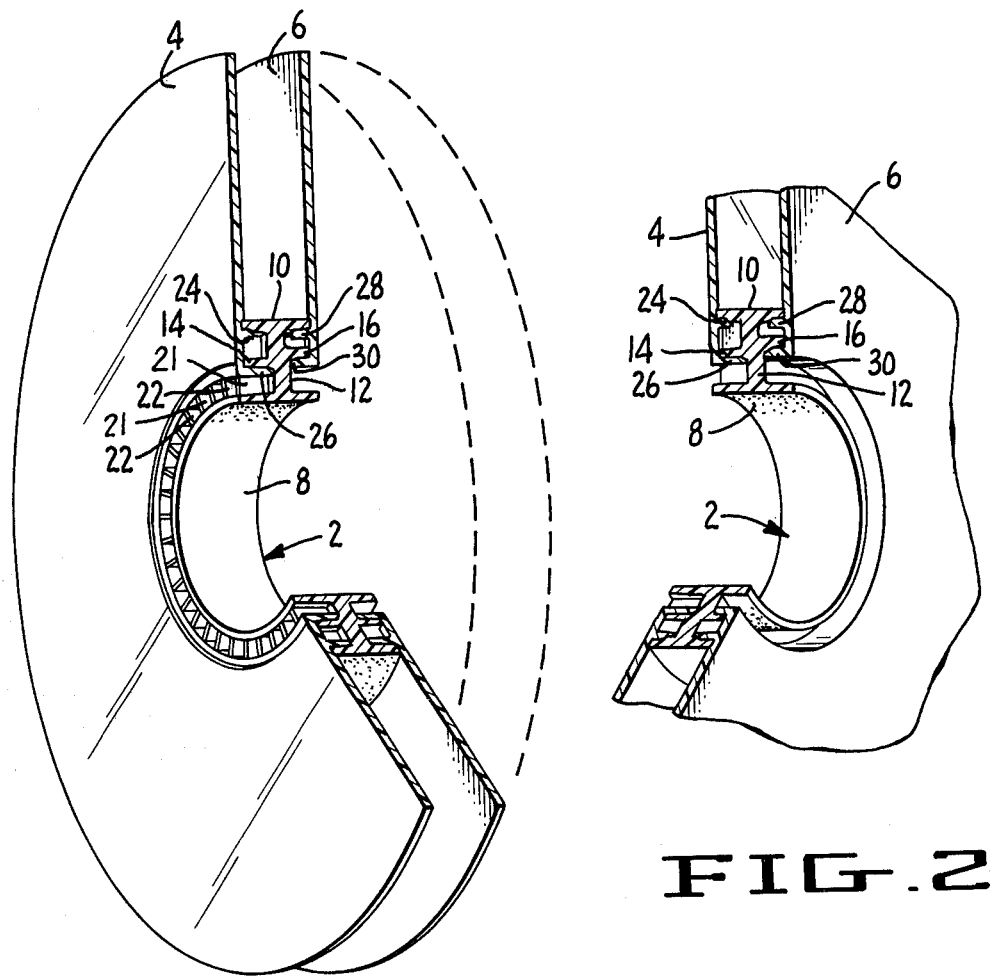
FIG. 1.
FIG. 2.
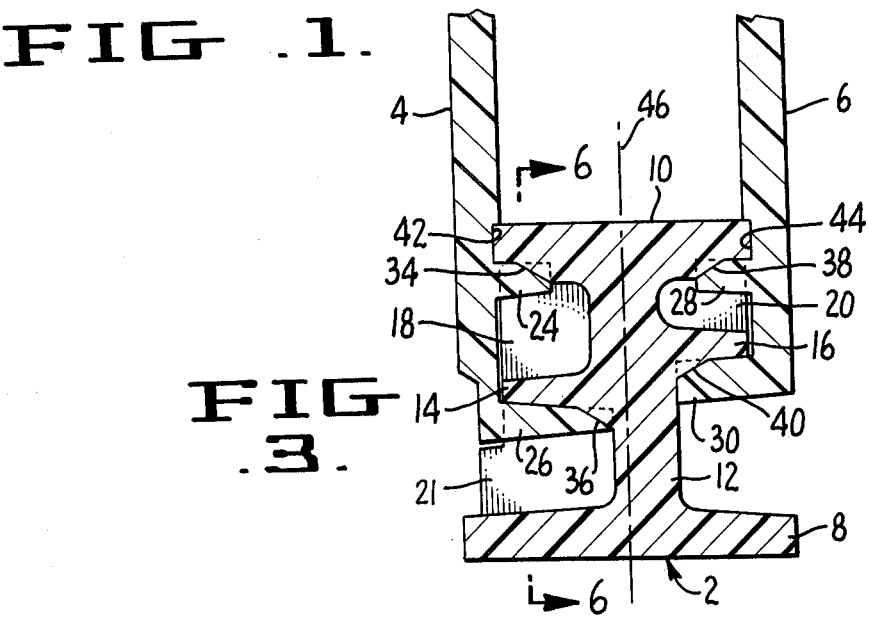
FIG. 3.

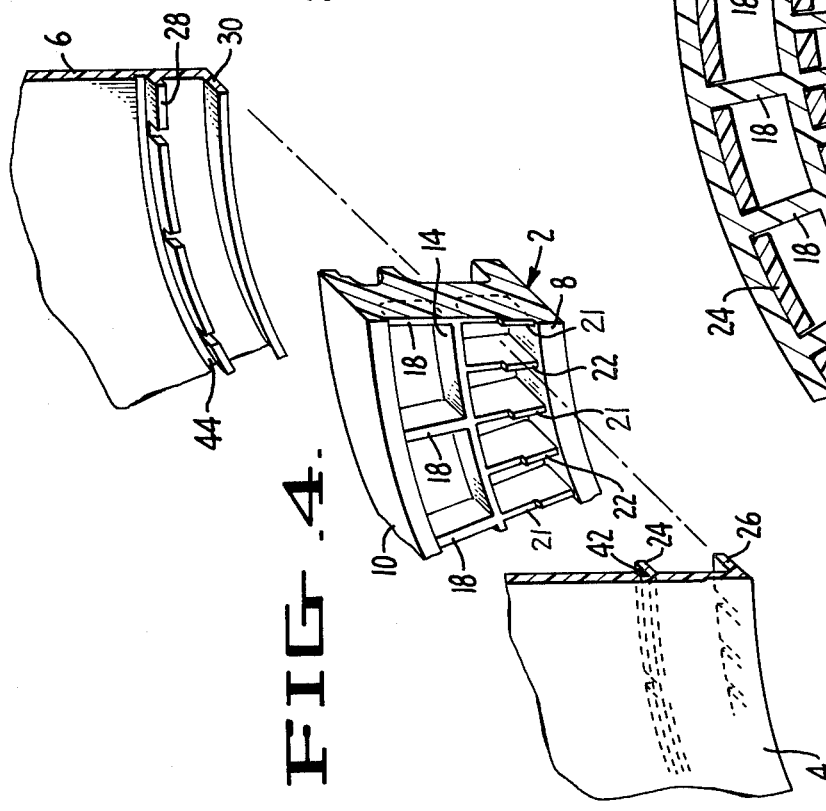

REEL FOR MAGNETIC RECORDING TAPE

RELATED APPLICATIONS

This application is a continuation of application Ser. No. 728,503, filed Oct. 1, 1976, now abandoned, in the name of Anil Vasudeva and Don W. Geri.

BACKGROUND OF THE INVENTION

This invention relates to a tape reel, and particularly to a reel for storing magnetic tape such as is used with computers.

Magnetic tape reels in the prior art have generally comprised either a metallic hub with spaced flanges attached thereto, or an all-plastic reel having both a plastic hub and plastic flanges attached thereto.

Prior art metallic hub reels have suffered several disadvantages, the principal one being the high cost of manufacture, both in the material and labor costs. Additionally, the metal hubs have a substantially different coefficient of thermal expansion from that of the tape and may cause stretching of the tape if the tape and reel are exposed to low temperatures.

Such high costs of manufacture have been ovecome to a large extent, by the use of synthetic resins or plastics for both the reel hub and its flanges. However, the prior art plastic reels have suffered numerous problems of their own. The primary problem of plastic reels has related to the inability of the plastic hub to withstand the compressive forces imparted to the hub by the wound tape. The requirement that all such reels have a standard groove provided for a recording lockout ring on one side has required an asymmetric design of the hub structure, with the reel having greater strength against compressive forces on the side opposite that having the lockout ring groove. This asymmetric design has thus resulted in an asymmetric distribution of the strength of the reel and its ability to resist deformation under load. Accordingly, when compressive forces are exerted upon the reel hub by the wound tape, especially at the higher tensions of newer tape drives, the reels have often tended to deform slightly in a "coning" manner. Even slight deformation of this nature causes the tape to tend to wind in a conical manner, bearing against one of the flanges, instead of winding squarely outwardly from the hub. Such conical winding tends to impart great stresses to the flange, frequently causing its fracture from the hub and possibly causing destruction of the tape wound thereupon.

Accordingly, it is an object of this invention to provide a tape reel which resists axially uneven compressive deformation. More particularly, it is an object of this invention to provide a reel having a stiffness or resistance to deformation which is generally equally distributed on opposite sides of a plane normal to the reel axis and passing through axial center of the reel. It is a further object of this invention to provide such a reel which is economical to manufacture. It is yet another object of this invention to provide such a reel in which both the hub and the flanges associated therewith are molded of synthetic resin material.

SUMMARY OF THE INVENTION

To achieve the above described objects of this invention a tape reel is described which includes a hub and a pair of opposed flanges attached to and extending radially outwardly from the hub. The hub further includes axially extending coaxial inner and outer rims joined by a radially extending web and a coaxial intermediate ring on each side of the web extending axially outwardly therefrom.

The flanges are attached to and end radially outwardly of the hub intermediate ring with the first flange received on the first axial side of the hub and the second flange received on the second, opposed axial side of the hub. Each flange includes hub support means cooperating with its respectively adjacent hub intermediate ring and with the hub outer rim to assist the hub outer rim in resisting radially inward deflection. A standard lockout ring groove is formed in the reel second side radially outward of the hub inner rim.

BRIEF DESCRIPTION OF THE DRAWINGS

FIG. 1 is a perspective view, partially in section, of the reel of this invention, illustrating the side of the reel which would be facing outwardly when the reel is mounted on a tape drive;

FIG. 2 is a fragmentary perspective view in section of the reel of FIG. 1, illustrating the opposite, inwardly facing side thereof;

FIG. 3 is a fragmentary sectional view of a portion of the hub and flanges of the reel of this invention;

FIG. 4 is an exploded view of a fragment of the reel of this invention, viewed from the outwardly facing side thereof;

FIG. 5 is an exploded view of a fragment of the reel of this invention, illustrating the inwardly facing side thereof; and FIG. 6 is a fragmentary sectional view of the reel of this invention, taken along line 6—6 of FIG. 3.

DESCRIPTION OF A PREFERRED EMBODIMENT

A preferred embodiment of the reel of this invention is illustrated in the perspective view, partially in section, of FIG. 1. This reel comprises three basic components, the hub 2, a front or first flange 4, and a rear or second flange 6. Suitably, both flanges 4 and 6 may be molded of a synthetic resin such as styrene. For additional strength it is desirable that the hub 2 be molded of a higher strength material than the flanges, suitably a filled synthetic resin such as glass-filled styrene or glass-filled styrene-acrylonitrile, commonly referred to as SAN. This higher strength hub material assists in resisting the radially inward forces exerted by tape wound upon the hub.

The manner of construction and detailed configuration of the reel components is best illustrated in the enlarged sectional view of FIG. 3. In this view it may be seen that the hub 2 comprises an inner rim 8, which engages the tape drive spindle, and an outer rim 10, upon which the tape is wound, joined together by a web 12 which extends radially between the two rims. Projecting axially from opposite sides of the web 12 are first side intermediate ring 14 and second side intermediate ring 16, which are coaxial with the rims 8 and 10 and thus with the reel itself. Extending between the outer rim 10 and the intermediate rings 14 and 16 are a plurality of hub outer ribs 18 and 20, also illustrated in FIGS. 4 through 6. By the use of this ribbed construction instead of heavy solid sections for the hub, the outer rim section 10 of the hub may be kept thin enough in section to avoid any sinking or distortion problems normally encountered with thick sections. Further to avoid thick sections it may be noted in FIGS. 4 and 5 that the ribs 18 and 20 are angularly positioned preferably in a staggered arrangement, so that no outer ribs 18 and 20 directly oppose one another. On the first side (the front or outside of the reel when mounted on a tape drive) it may be noted that the hub first side outer ribs 18 are aligned with radially extending inner ribs 21 which join intermediate ring 14 with inner rim 8. By this ribbed construction radially compressive forces acting upon outer rim 10 may be transmitted directly to the intermediate rings 14 and 16, and any such loads on first side intermediate ring 14 may be transmitted directly to the inner rim 8 for further support. As is best indicated in FIGS. 4 and 6, a plurality of auxiliary inner ribs 22 also extend radially between first side intermediate ring 14 and inner rim 8. These auxiliary ribs 22 are positioned such that one such rib is located between each adjacent pair of inner ribs 21. Due to the industry standard requirement that a recording lockout ring groove be provided on the side of the reel facing the tape drive, no corresponding ribs extend between second side intermediate ring 16 and the inner rim 8.

The opposed flanges 4 and 6 are best illustrated with reference to FIGS. 3 through 5. These flanges are generally annular disc-like members attached to the hub 2. Each flange includes flange ring means preferably in the form of a pair of coaxial rings extending axially inwardly of the reel with the radially outer ring defining the first portion of the flange ring means and the radially inner ring defining a second portion of the flange ring means. On the front or first flange 4 the radially outer and inner such rings are denoted respectively by reference numbers 24 and 26; on rear or second flange 6 the corresponding rings are denoted by reference numbers 28 and 30. From FIGS. 4 and 5 it may be seen that flange rings 24 and 28 are slotted to straddle hub ribs 18 and 20, respectively. Additionally, flange ring 26 is slotted to straddle both inner ribs 18 and auxiliary ribs 22. By this straddling engagement between the slotted flange rings and the hub first ride outer ribs a positive means of torque transmission between the hub 2 and the respective flanges 4 and 6 is provided. The engagement between the ribs on the first side of the hub and the slotted flange rings on the first flange 4 may also be seen in the sectional view of FIG. 6.

While any suitable method, such as adhesive bonding, for attaching the flanges 4 and 6 to the hub 2 may be used, it is preferred to attach the flanges to the hub by means of ultrasonic weldments. To provide for these weldments, angled fillets 34, 36, 38, and 40 are provided on the radially inward facing portions of outer rim 10 and intermediate rings 14 and 16, as best illustrated in FIG. 3. Prior to assembly and such ultrasonic welding the axially innermost portions of flange rings 24, 26, 28, and 30 are generally squared-off, as indicated by the dotted lines in FIG. 3. However, during the ultrasonic welding process those squared portions are melted to form a bond between the flange rings 24, 26, 28, and 30 and the corresponding angled fillets 34, 36, 38, and 40, as illustrated in FIG. 3. If desired, the rib straddling arrangement of the slotted flange rings could also provide an increased area for sonic welding. It may be noted that the auxiliary inward facing portions of each flange 4 and 6 also include, on a portion of the flange adjacent and radially outward of the respective outer rings 24 and 28, circular grooves 42 and 44 for receiving the corresponding portions of the hub outer rim 10 as shown in FIG. 3.

From the above description it may be seen that, upon assembly of the flanges to the hub, the flange rings 24, 26, 28, and 30 provide additional support against compressive deformation of the hub outer rim 10 and the hub intermediate rings 14 and 16. By virtue of this engagement any radially compressive deformation of those hub portions would require a corresponding compressive deformation of the immediately adjacent flange rings. Additionally, the integral formation of the flange rings on the flanges 4 and 6 provides for transfer and distribution of any such load to other adjacent portions of the flange, thus providing further improved support the hub outer rim 10. As noted above, a primary problem of all plastic reels such as this relates to the combination of compressive forces exerted upon the hub outer rim by the tape and the requirement that a lockout ring groove be provided adjacent the inner rim 8 of the hub. In the present reel this groove is defined by the radially outward facing portion of hub inner rim 8, a portion of hub web 12 and the radially inward facing portion of second flange inner ring 30. The requirement that such a groove be provided in the reel precludes the placing of strengthening ribs between the hub intermediate ring 16 and the inner rim 8 on the second side of the reel. Desirably to avoid warping of the reel the strength of the reel and its resistance to deformation under such compressive forces from the tape wound thereupon should be distributed essentially symmetrically about a plane normal to the reel axis and disposed axially centrally of the reel. The location of such an axially central plane is indicated on FIG. 3 by the broken line 46.

In conventional prior art reels the requirement of the provision of the lockout ring groove has generally caused the stiffness or resistance to compressive deformation of the reel to be distributed asymmetrically of this axially central plane. This uneven distribution has often resulted in the reel deforming in a generally conical manner under conditions of repetitive loading of tightly wound recording tape. In the reel of this invention, however, this problem has been solved by the creation of a generally balanced design.

From the foregoing it is recognized that the basic problem faced in the reel of this invention is the absence of any hub ribs or hub material in the lockout ring groove to balance the stiffness and strength imparted by the inner ribs 21 and auxiliary inner ribs 22 extending from the intermediate ring 14 to the hub inner rim 8 on the opposite, first side of the hub. Thus, some means desirably should be provided to supply corresponding support against the radially compressive forces exerted upon the hub outer rim 10 and carried by ribs 20 to the intermediate ring 16 on the second side of the hub. There is no problem of asymmetrical hub stiffness radially outwardly of intermediate rings 16, since the provision of ribs 18 and 20 on both sides of the hub render the stiffness and resistance to deformation of that portion of the hub substantially symmetrical about the axially central plane 46. Thus, the portions of the hub radially outward of intermediate ring 16 are of substantially equal thickness and generally symmetrical configuration on both sides of the axially central plane 46.

To maintain the generally symmetrical distribution of stiffness and strength radially inward of intermediate ring 16, the bulk of the material in the hub web 12 is displaced axially of the central plane 46 toward the lockout ring groove. This displacement of the web material is intended to compensate by the location and thickness of the web for the absence in the lockout ring groove of any ribs corresponding to extended ribs 18.

Additional considerations then dictate the preferred location and configuration of the hub and flange rings. As noted above, it is desirable to locate the flange rings radially inward of their mating portions on the hub rim and intermediate rings, to resist compressive deformation of those hub portions. This configuration also increases the moment arm resisting outward bending and deflection of the flanges, to provide additional strength to those members. To maximize these benefits it is desirable to have the radially inner and radially outer rings of each flange spaced well apart, as is provided on flange 4. However, the lockout ring groove prevents this wide spacing for the rings of second flange 6. Thus, hub second intermediate ring 16 is necessarily displaced radially outward from the location of hub first intermediate ring 14. To strengthen the second side of the reel with this lockout ring groove, against compressive deformation, the radially inner second flange ring 30 is formed of a thicker section than its counterpart inner ring 26 of first flange 4. To further balance the strength and stiffness of the two sides of the reel, the weaker first flange material of innermost flange ring 26 (instead of the stronger hub material) is located opposite the lockout ring groove. This necessitates the placement of hub first side intermediate ring 14 opposite the innermost ring 30 of the second flange 6, and thus further militates for the staggered placement of the opposing hub intermediate rings 14 and 16. Another benefit of the radially offset hub intermediate rings is the avoidance of undesirably thick plastic sections that might cause warpage or sinking during the molding process. From an analysis of relative material strengths and volumes and moment arms it may be seen that this preferred configuration provides the desired control and balancing of the stiffness and resistance to deformation of the reel that is desirable to resist asymmetrical deformation and distortion of the reel. Thus, the reel of this invention overcomes the problem of the asymmetrical distribution of strength and resistance to deformation commonly found in the prior art reels, while remaining relatively simple and economical to manufacture.

While the foregoing describes a preferred embodiment of the reel of this invention, it is to be recognized that numerous other embodiments employing the principles of this invention will readily become apparent to those skilled in the art. Accordingly, the foregoing description is intended to be illustrative only of those principles of the invention and not to be limitative thereof. The scope of this invention is thus to be limited not by the foregoing description but solely by the claims appended hereto.

What is claimed is:

1. A reel for magnetic recording tape, comprising
   a hub including axially extending coaxial inner and outer rims joined by a radially extending web, and a coaxial intermediate ring on each side of said web extending axially outwardly of said web;
   a pair of opposed flanges attached to and extending radially outwardly of said hub with a first said flange received on a first axial side of said hub and a second said flange received on the second, opposed axial side of said hub, each flange having a pair of coaxial rings extending axially inwardly of said reel with the radially outer said flange ring on each said flange being received against the corresponding radially inward portion of said outer rim, and the radially inner said flange ring on each said flange being received against the radially inward portion of the corresponding said intermediate ring, whereby the flange rings may serve to support their adjacent respective hub outer rim and intermediate ring portions against radially inward deflection; and
   a lockout ring groove formed in said reel second side between said hub inner rim and said second flange inner ring.

2. A reel according to claim 1 further comprising a plurality of outer ribs extending radially between said hub outer rim and said intermediate rings on both sides of said hub, whereby the hub outer ribs may serve to carry a portion of any radially deforming forces on the outer rim to the intermediate rings for support.

3. A reel according to claim 2 wherein said radially outer flange rings are slotted to straddle said outer ribs, whereby torque may be transmitted from said hub to said flanges by the engagement of the ribs and the ring slots.

4. A reel according to claim 2 further comprising a plurality of radially extending inner ribs extending between said intermediate ring and said inner rim, whereby a portion of any radially deforming forces acting on the hub outer rim or first side intermediate ring may be carried through to the inner rim for support thereby.

5. A reel according to claim 4 further comprising auxiliary inner ribs extending radially between said hub first side intermediate ring and said inner rim and positioned between adjacent said inner ribs.

6. A reel according to claim 5 wherein said outer rings of said first and said second flanges are slotted to straddle said hub outer ribs, and said inner ring of said first flange is slotted to straddle both said inner ribs and said auxiliary inner ribs.

7. A reel according to claim 4 wherein the portion of said hub web between said second side intermediate ring and said hub inner rim is of greater thickness on the second side of a plane which is normal to the reel axis and disposed axially centrally of the reel than on the first side of said plane, whereby the thickened web may compensate in strength for the absence of supporting hub material and ribs in the lockout ring groove on the reel second side to resist deflection under load.

8. A reel according to claim 7 wherein the portion of said hub web radially outward of said hub second side intermediate ring is of substantially equal thickness on either side of said axially central plane.

9. A reel according to claim 7 wherein said hub second side intermediate ring is set radially outward of said hub first side intermediate ring such that said hub first side intermediate ring is disposed generally opposite said second flange inner ring, and said first flange inner ring is disposed generally opposite a portion of said lockout ring groove, whereby the resistance of the reel to radial deformation from the stresses of tape wound thereupon may be made substantially equal on either side of the axially central plane.

10. A reel according to claim 9 wherein said hub is formed of a material of higher strength than the material forming said flanges.

11. A reel according to claim 10 wherein said second flange inner ring is of greater thickness than said hub first side intermediate ring, whereby the greater thickness of the flange ring may offset the greater strength of the material of that opposed intermediate ring.

12. A reel according to claim 10 wherein said flange material comprises a synthetic resin and said hub material comprises a synthetic resin having a generally fibrous filler.

13. A reel according to claim 12 wherein said hub material comprises a glass-filled synthetic resin.

14. A reel according to claim 1 wherein said flanges are attached to said hub by ultrasonic weldments.

15. A reel according to claim 1 wherein the axially inwardly facing portion of each said flange includes, on the portion of the flange adjacent and radially outward of said outer ring, a circular groove for receiving the corresponding portion of the hub outer rim.

16. A reel for magnetic recording tape, comprising
 a hub formed of synthetic resin material having opposed first and second sides and including
  axially extending coaxial inner and outer rims joined by a radially extending web,
  a pair of coaxial intermediate rings, one said intermediate ring extending axially outward of each side of said web, with the second side intermediate ring being of a larger diameter and thus offset radially outward of said first side intermediate ring,
  the portion of said hub web between said second side intermediate ring and said hub inner rim being of greater thickness on the second side of a plane which is normal to the reel axis and disposed centrally of the reel than on the first side of said plane,
  a plurality of ribs extending radially between said hub outer rim and said hub inner rim on said hub first side, and
  a plurality of ribs extending radially between said hub outer rim and said hub intermediate ring on said hub second side;
 a pair of opposed flanges, formed of synthetic resin material, attached to said hub first and second sides, respectively, and extending radially outward of said hub, each said flange having a pair of coaxial rings extending axially inward of said reel, the radially outer said flange ring on each said flange being received against the corresponding radially inward portion of said hub outer rim and the radially inner said flange ring on each said flange being received against the radially inward portion of the corresponding said intermediate ring, said radially outer ring on each said flange being slotted to straddle said hub ribs, whereby torque may be transmitted from said hub to said flanges by the engagement of the ribs and the ring slots; and
 a lockout ring groove formed in said reel second side between the radially outer portion of said hub inner rim and the radially inner portion of said second flange inner ring.

17. A reel for magnetic recording tape comprising
 a hub including axially extending coaxial inner and outer rims joined by a web extending radially therebetween and a coaxial intermediate ring on each side of said web extending axially outwardly of said web;
 a pair of opposed flanges attached to and extending radially outwardly of said hub intermediate ring with a first said flange received on a first axial side of said hub and a second said flange received on the second, opposed axial side of said hub, each said flange including hub support means cooperating with its respectively adjacent said intermediate ring and said hub outer rim to assist said hub outer rim in resisting radially inward deflection; and
 a lockout ring groove formed in said reel second side radially outward of said hub inner rim.

18. A reel according to claim 17 further comprising means for balancing the resistance of said reel outer rim against radially compressive deformation generally equally on either side of a plane which is normal to the reel axis and disposed axially centrally of the reel, whereby any radially compressive deformation caused by tape wound upon the outer rim of the reel may be maintained generally equal on either side of that plane.

19. A reel according to claim 18 wherein said deformation resisting balancing means comprises, in combination, a plurality of inner ribs extending radially between said hub inner rim and said intermediate ring on said hub first side, and the provision of a greater thickness of said hub web on said axially central plane second side than on said plane first side, whereby the thickened web may compensate in strength and resistance to deformation for the absence of supporting hub material in the lockout ring groove on the reel second side so that the thickened web and hub inner ribs may cooperate with the hub intermediate rings and the hub support means on the flanges to balance generally the resistance of the hub against radially compressive deformation on either side of the axially central plane.

20. A reel according to claim 19 further comprising a plurality of outer ribs extending radially between said hub outer rim and said hub intermediate rings on both sides of said hub, whereby the outer ribs may serve to carry a portion of any radially deforming forces on the hub outer rim to the hub intermediate rings for support.

21. A reel according to claim 20 wherein said hub support means on each said flange comprises flange ring means extending axially inwardly of said reel, with a first portion of each said flange ring means engaging said hub outer rim and a second portion of each of said flange ring means engaging its respectively adjacent hub intermediate ring.

22. A reel according to claim 21 wherein said flange ring means comprises a pair of coaxial rings with said flange ring means first portion comprising the radially outer said flange ring and said flange ring means second portion comprising the radially inner said flange ring, said outer flange ring being slotted to straddle said hub outer ribs, whereby torque may be transmitted from the hub to the flanges by the engagement of the outer ribs and the outer flange ring slots.

23. A reel according to claim 17 further comprising a plurality of inner ribs extending radially between said hub inner rim and said hub intermediate ring on said hub first side, whereby a portion of any radial deforming forces acting on the hub outer rim and carried to the intermediate ring may be carried through to the hub inner rim.

24. A reel according to claim 23 further comprising a plurality of outer ribs extending radially between said hub outer rim and said hub intermediate rings on both sides of said hub, whereby the outer ribs may serve to carry a portion of any radially deforming forces on the outer rim to the intermediate rings for support.

25. A reel according to claim 23 wherein said hub web between said second side intermediate ring and said hub inner rim is of greater thickness on the second side of a plane which is normal to the reel axis and disposed axially centrally of the reel than on the first side of said plane, whereby the thickened web may compensate in strength for the absence of supporting hub material and ribs in the lockout ring groove on the reel second side to resist deflection under load.

26. A reel according to claim 25 wherein the portion of said hub web radially outward of said hub second side intermediate ring is of substantially equal thickness on either side of said axially central plane.

* * * * *